UNITED STATES PATENT OFFICE.

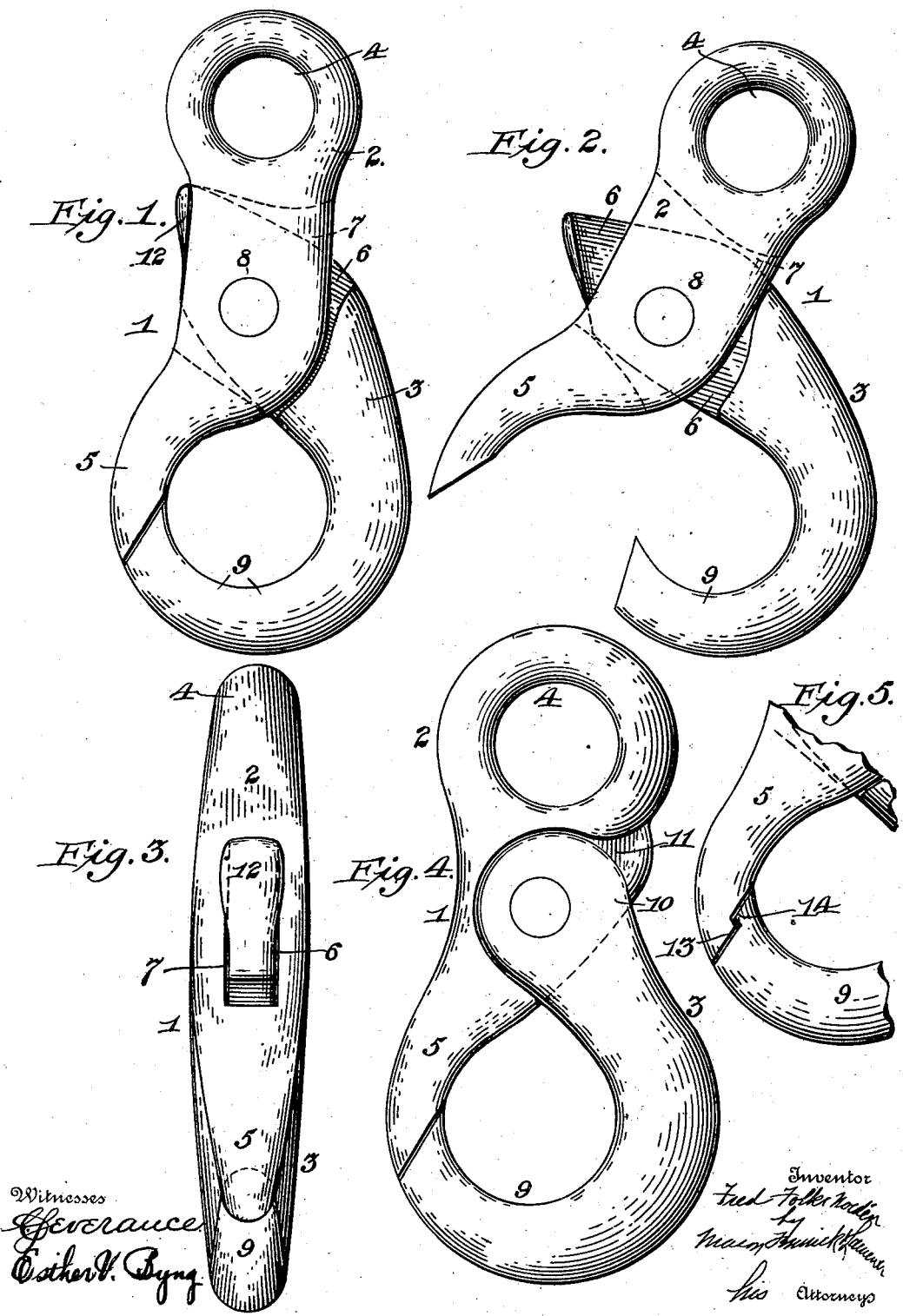

FRED FOLKE NORDÉN, OF NEW YORK, N. Y.

DRAFT-HOOK.

SPECIFICATION forming part of Letters Patent No. 661,069, dated November 6, 1900.

Application filed January 24, 1900. Serial No. 2,685. (No model.)

*To all whom it may concern:*

Be it known that I, FRED FOLKE NORDÉN, a citizen of the United States, residing at New York, (Brooklyn,) in the county of Kings and State of New York, have invented certain new and useful Improvements in Draft-Hooks; and I do hereby declare the following to be a full, clear, and exact description of the invention, such as will enable others skilled in the art to which it appertains to make and use the same.

My invention relates to improvements in draft-hooks; and it consists in certain novel constructions, combinations, and arrangements of parts, as will be hereinafter fully described and claimed.

In the accompanying drawings, Figure 1 represents a side elevation of a draft-hook constructed in accordance with my invention. Fig. 2 represents a similar view of the said hook, but showing its jaws separated. Fig. 3 is an edge view of the same, and Fig. 4 represents a side elevation of a modified form of the said hook. Fig. 5 represents a detail view showing a shouldered joint between the guard-finger and the hook.

My invention is designed to provide hooks for tackle or hoisting apparatus of any kind, as well as for any other draft mechanism, which shall be so formed as not to easily catch in ropes or other kinds of apparatus located near the hooks when in use. It is designed to supply hooks which shall be closed by a weight placed upon them and yet will have their jaws so disposed with relation to one another as to strengthen each other.

With these objects in view my invention comprises a draft-hook 1, formed of an attaching member 2 and a hook member 3. The attaching portion 2 is formed with an eye, as 4, which may be secured to any draft-tackle. The lower end of the attaching member 2 is prolonged to form a jaw or guard-finger, as 5. The hook member 3 is preferably reduced at its upper end, as at 6, and adapted to extend into a slot, as at 7, formed in the attaching member 2. A pivot-bolt, as 8, is passed through the attaching member and the hook member, so as to pivotally secure the two parts together. The hook member extends downwardly from its pivotal point in such a manner as to form a very strong hook, as 9, its outer free end being adapted to come in contact with the jaw or guard-finger 5 when the hook is closed.

The parts of my improved draft-hook are preferably well rounded and are of such a shape, as will be seen by the drawings, that there are no projections to engage ropes or other tackle which may be in close proximity to the hook. This is an important feature of my invention, especially when such hook is used in connection with ship-tackle, as the cordage and other parts of the ship's tackle are often closely interwoven, and when a hoisting apparatus is employed among them are likely to catch upon the same, especially if there are any projections or shoulders upon the hooks or blocks.

Another important feature of my invention is the manner in which the jaws of the draft-hook fit upon each other. It will be seen that the end of the hook 9 comes within the inner surface of the guard-finger 5 and that when weight is applied upon the hook it will force the hook tightly against the said finger 5. It is apparent that there will be a tendency when a strong draft or load is applied upon the hook to straighten out the material forming the hook. This tendency is obviated in a large measure by the guard-finger 5, which so far overlaps the end of the hook 9 that it gives it lateral support and prevents to a considerable degree any chance of straightening the hook out under a severe test. Of course the greater the strain upon the draft-hook, the pull being applied upon the eye 4 and the hook 9, the more will the hook be sustained by the pressure of the guard-finger 5 against the end of the said hook.

To further strengthen the action of the hook member, the reduced end portion thereof, which is passed through the slot in the attaching member, may be headed, as at 12, after the parts have been pivoted together. This head when the hook is closed will serve to strengthen the parts and limit their movement.

It will be noted that the joint between the two members of the hook may be made in various ways without departing in the least from the spirit of my invention. As seen in Fig. 4 of the drawings, the hook member may be bifurcated at its upper end 10, the said bifurcated portion being adapted to embrace the reduced portion 11 upon the attaching member. In this construction all shoulders or projections which are likely to catch in anything when the hook is in use can be dispensed with, making the hook valuable for all kinds of work.

In order to make the engagement between the guard-finger and the hook more secure, the said guard-finger may be provided with a shouldered portion 14, as will clearly appear by reference to Fig. 5 in the drawings. When the parts are closed, it will be seen that the hook is strongly supported by this kind of a joint.

It will be observed from the above description that I am enabled to produce a draft-hook which is exceedingly strong and which will not catch upon other materials when in use and which has its parts so arranged as to thoroughly brace each other. Such a hook is not complicated, but simple of construction and easily manufactured.

Having now described my invention, what I claim as new, and desire to secure by Letters Patent, is—

1. A draft-hook, comprising an attaching member, and a hook member pivoted together, a guard-finger upon the attaching member extending outside the end of the hook for giving it lateral support, the hook being so pivoted that weight placed upon it will force it against the guard-finger, substantially as described.

2. A draft-hook, comprising an attaching member provided with a securing-eye, a guard-finger formed upon the attaching member, a hook member pivoted to the attaching member and having its end resting normally against the inner surface of the guard-finger, the pivot-point of said hook member being arranged a little to one side of the line of draft on the hook, so that a strain upon the hook will press it against the guard-finger, the said guard-finger thus giving it lateral support, substantially as described.

3. A draft-hook, comprising an attaching member and a hook member, an eye formed upon the attaching member, a guard-finger formed upon the lower end of the said attaching member, a reduced portion formed upon the hook member and adapted to extend through a slot formed in the attaching member, a pivot-bolt for joining the parts together, a head on the said reduced portion for strengthening the hook, the lower end of the guard-finger being so extended as to extend outside and overlap the free end of the hook member, whereby tendency to straighten the hook under an excessive load will be prevented by the pressure of the guard-finger against the end of the hook, substantially as described.

4. A draft-hook, comprising an attaching member and a hook member pivoted together, a guard-finger integral with the attaching member and provided with a shouldered end portion, a shouldered end portion formed upon the hook member for engaging the same, whereby the guard-finger will give the hook lateral support and greatly strengthen the hook, substantially as described.

In testimony whereof I hereunto affix my signature in presence of two witnesses.

FRED FOLKE NORDÉN.

Witnesses:
   THOS. CHRISTIAN,
   F. G. PITCHER.